United States Patent [19]
Zimmermann

[11] 3,730,043
[45] May 1, 1973

[54] APPARATUS FOR SHEARING WEBS

[75] Inventor: Ernest F. Zimmermann, Buffalo Grove, Ill.

[73] Assignee: Ampex Corporation, Redwood City, Calif.

[22] Filed: Nov. 9, 1970

[21] Appl. No.: 87,890

[52] U.S. Cl. ................................................83/502
[51] Int. Cl. .............................................B23d 19/06
[58] Field of Search ................................83/500–503

[56] References Cited

UNITED STATES PATENTS

| | | | |
|---|---|---|---|
| 3,173,326 | 3/1965 | Gulliksen | 83/501 |
| 3,055,249 | 9/1962 | Lord | 83/501 |
| 1,754,969 | 4/1930 | Spoor | 83/501 X |
| 1,525,590 | 2/1925 | Perrault | 83/501 |
| 984,024 | 2/1911 | Pringle | 83/501 X |
| 1,673,336 | 6/1928 | Lehmicke | 83/501 X |
| 3,173,325 | 3/1965 | Warren | 83/501 X |

Primary Examiner—Donald G. Kelly
Attorney—Anderson, Luedeka, Fitch, Even and Tabin and Robert G. Clay

[57] ABSTRACT

Thin webs are sheared into a plurality of strips having straight line parallel edges by a shearing apparatus having first and second sets of rotatable shearing blades. Preferably, a third set of rotatable blades engages the first set of shearing blades to balance the loads exerted thereon due to engagement with the second set of blades. Individual springs bias the first set of blades to slide longitudinally along a support shaft to compensate for wear and to maintain a preloaded and forcible engagement between the shearing blades. Preferably, the second set of blades have shearing surfaces harder than shearing surfaces on the first set of blades so that wear predictably occurs on the first set of blades.

6 Claims, 13 Drawing Figures

INVENTOR
ERNEST F. ZIMMERMANN

Anderson, Luedeka, Fitch, Even & Tabin
ATTYS.

INVENTOR
ERNEST F. ZIMMERMANN
ATTYS.

INVENTOR
ERNEST F. ZIMMERMANN

Anderson, Luedeka, Fitch, Even, & Tabin
ATTYS.

APPARATUS FOR SHEARING WEBS

This invention relates to an apparatus for shearing webs or films into a plurality of strips or tapes having parallel edges and more particularly to shearing very thin films into tapes having close tolerance width dimensions.

The present invention is particularly useful for shearing very thin webs, for example, synthetic resin films having a cross sectional thickness of 1 to 2 mils, although the apparatus may be used for shearing thicker webs made of different materials. Usually such webs are produced at relatively high speeds and wide widths which are then subsequently divided by severing into individual tapes. In the case of magnetic or video tape webs, the individual severed tapes must meet rigorous tolerance dimensions. Typically, a magnetic tape has a substrate made of Mylar and on the substrate is a coating of ferrous oxide for magnetic recording. For example, magnetic tapes used in cartridges or in open reels are often made by coating a 6–12 inch wide web of Mylar with iron oxide and then subsequently severing this web into 20 individual tapes each having a width of from 0.250 to 2.00 inches. In other instances, the web may be as wide as twelve inches where the web is to be severed into one inch tapes such as video tapes or the like. Depending on the particular use of the tape, the width tolerance dimension is usually desired to be held to at least plus or minus 0.002 inch. Such close tolerances should be held for the extremely long length of magnetic tapes.

For the economic production of inexpensive thin film magnetic tapes particularly as used in low cost tape cassettes or tape cartridges, the severing of the magnetic tape webs into individual magnetic tapes must take place at relatively high speeds and for prolonged periods of time without stopping the apparatus for servicing, maintaining or replacing of the blades. Militating against long blade life is the fact that the iron oxide coating on the film is extremely hard, for example, an iron oxide may have MOHS of 7. Such hardness leads to blade wear and the loss of a fine edge on the blade.

One presently used method of shearing webs of magnetic tape is to provide two rotating arbors each with a series of shearing blades spaced apart by precision width spacers with the blades and spacers alternating on the arbors. The web to be cut, for example, a nominal width 12 inch web, is fed in a direction perpendicular to the blades and between the arbors where each pair of shear blades on the respective arbors causes a tape to be severed from the web. When shearing webs, for example, of 1 mil thickness, it is necessary that each blade be abutted with adjacent its associated, opposite shear blade on the other mandrel or otherwise the film tends to bend into the space between the set of shear blades and either rolls or extrudes before rupturing leaving the severed tapes with damaged edges.

To obtain a close engagement between each set of shear blades on the respective arbors, the spacers are ground to extremely close tolerances, for example, plus or minus 50 millionths of an inch. Even with such close tolerance spacers, the tolerance build-up along the length of the arbor sometimes results in the blades not being properly positioned. Also the assembly operation must be made with great care so that dirt or other foreign matter does not become imbedded between spacers causing a loss of the precision accuracy of the 50 millionth tolerance dimension for the spacers.

To assure that the spacers are abutted one against another and that the blades of the respective arbors are, in fact, in close cutting relationship to one another, the web to be cut is fed between the blades to see if each pair of shearing blades actually severs the web. In practice, if one or more pair of blades are not cutting, a retainer nut on one of the arbors is continually tightened to shift the blades and apply greater pressure until all of the sets of blades are shearing the web. However, such a tightening of the retainer nut results in an uneven distribution of preload pressure between various ones of the sets of shear blades inasmuch as those sets already shearing may have had the proper pressure but with additional pressure applied thereto by the retainer nut, these overloaded blades may deflect or bend slightly. The bending of a thin blade edge also may result in a poor quality edge for the tape and also results in faster wear of the blades. Due to such preload conditions and also to the hardness of the iron oxide on the webs, such prior art shearing apparatus have been found to have relatively short lives in some instances, as little as several hours and usually no longer than several days.

The bending of the thin film into a space between a pair of shear blades not only results in a more ragged and extruded edge but also results in a peeling of the iron oxide particles from the edge of the tape making it less suitable for use in a magnetic or video tape system. Additionally, the preloading of the blades may result in a bending or cocking of the blades from a position in which the entire blade is disposed normal to the web at the time of shearing. If the blades are cocked and are allowed to flex in and out of planes normal to the web during the rotation of the blades, the severed edges may be serpentine rather than straight lines over the long distance of the tape.

Accordingly, an object of the present invention is to provide a new and improved shearing apparatus which overcomes the disadvantages of the prior art shearing devices.

These and other objects of the invention will become apparent from the following detailed description taken in connection with the accompanying drawings in which.

Figure 4:
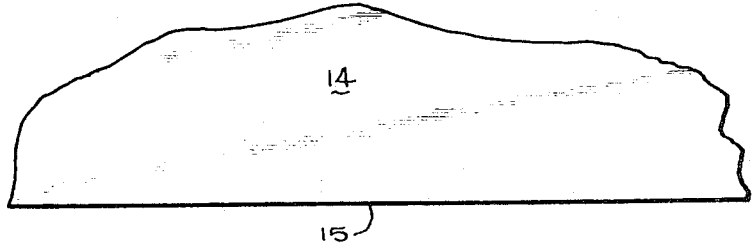
FIG. 4 is an enlarged plan view of a longitudinally extending edge of a tape severed by the apparatus of FIG. 3.
Figure 6:
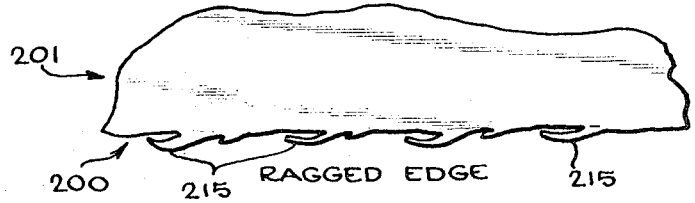
Figure 7:
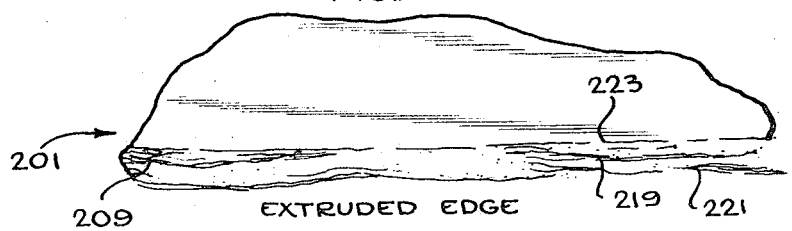
Figure 8:
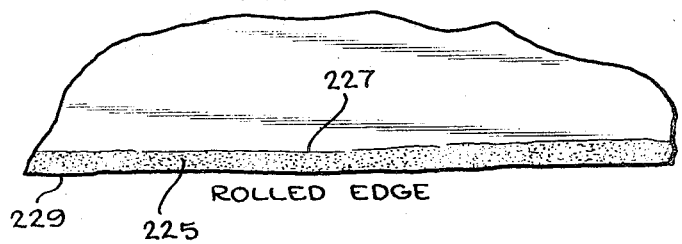
Figure 9:
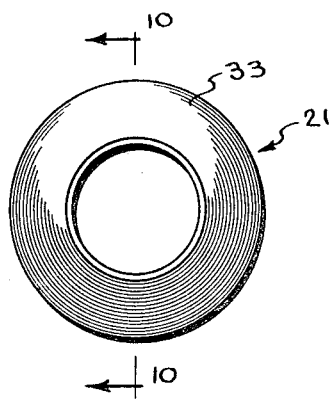
FIG. 9 is a side elevational view of a bellows spring.

As shown in the drawings for purposes of illustration, the invention is embodied in a shearing apparatus 11 for shearing a web 12 into a plurality of strips or tapes 14 having parallel side edges 15 held to a close tolerance width dimension, for example, within several thousandths of an inch. The illustrated web 12 is a magnetic tape web having a Mylar substrate and a coating of ferrous oxide thereon for the recording of intelligence. To shear a straight line, smooth edge 15, such as shown in FIG. 4, each of the respective sets of shear blades 17 and 19 have their respective blades biased into engagement with one another with a predetermined pressure so that the web 12 is prevented from bending, rolling or otherwise moving into a position between the blades which results in an extruded rolled or ragged edge, as seen in FIGS. 6, 7 and 8. More specifically, each blade 17, hereinafter referred to as main blade 17, is biased by an individual spring 21 to abut against an associated, backing shear blade 19.

As will be explained in greater detail, it is preferred that each of the main blades 17 be slidably mounted on a support arbor or shaft 23 and urged by its spring 21 against its backing blade 19. The springs 21 will only apply a maximum desirable preload to their associated main blade 17 and backing blade 19 with the tightening of a retainer nut 25 (FIG. 3), with the result that upon tightening of the retainer nut, each of the sets of blades have approximately a uniform loading thereon. Thus, there is eliminated the condition wherein the thinner main blades may be so overloaded as to bend or deflect while others of thinner main blades may have a minimal light preload pressure which eventually allows the web to bend or roll between a main blade and its backup shear blade.

To provide a good clean and a consistently parallel straight edge 15 for the tape, the main blades 17 should be in and remain in planes in which their cutting edges are substantially perpendicular to the path of the travel of the web 12. To this end, the main blades 17 are held against being cocked, that is, rotated relative to a position normal to the path of travel of the web by means engaging the main blades 17 at positions angularly spaced from the backing blades 19 and applying forces on the main blades 17 to angularly balance the load due to the preload between the main blades 17 and the backing blades 19. The preferred manner to achieve such a balance is to provide another set of backing shear blades 29 which engage the main blades 17 at positions diametrically opposite from the position at which the blades 19 are engaging the main blades 17. As will be explained in connection with FIG. 3, a second web 12a may be simultaneously fed between the main blades 17 and the blades 29 whereby two webs may be sheared simultaneously.

For the purpose of prolonging the longevity of the cutting operation before replacement of the shearing blades and also for the purpose of maintaining a consistently good quality cutting edge for a prolonged period of time, the shear blades are designed so that the wear will predictably occur on one kind of blade. To this end, because the main blades 17 are slidable on the arbor 23 and biased against the backing blades 19, the wear is allowed to occur at the main blades 17 which will slide along the shaft to maintain the close contact at the preload pressure even after wear. In the preferred embodiment of the invention, the backing blades 19 are provided with a surface having a hardness of at least 9 MOHS, which is harder than the approximate 7 MOHS hardness of the iron oxide. The illustrated main blades 17 are formed of steel and have a hardness which is less than that of the backing blades 19. Thus, the steel main blades 17 will wear before the harder backup blades wear and the wear may be compensated by the sliding of the main blades 17 longitudinally on the arbor 23 under urging of the springs 21. In the illustrated embodiment of the invention the backing shear blades 19 have shearing surfaces which are formed of a refractory, for example, alumina which is sprayed on the main body of the blade and then machined to a final surface finish of 5–10 micro inches. Also, as will be explained in greater detail, the assemblies of main and backing blades are supported by thrust means which isolated the loads experience into axial and radial components which may be compensated for and thereby prevent any misalignment or deviations which would interfere with the quality cut received.

Figure 3:
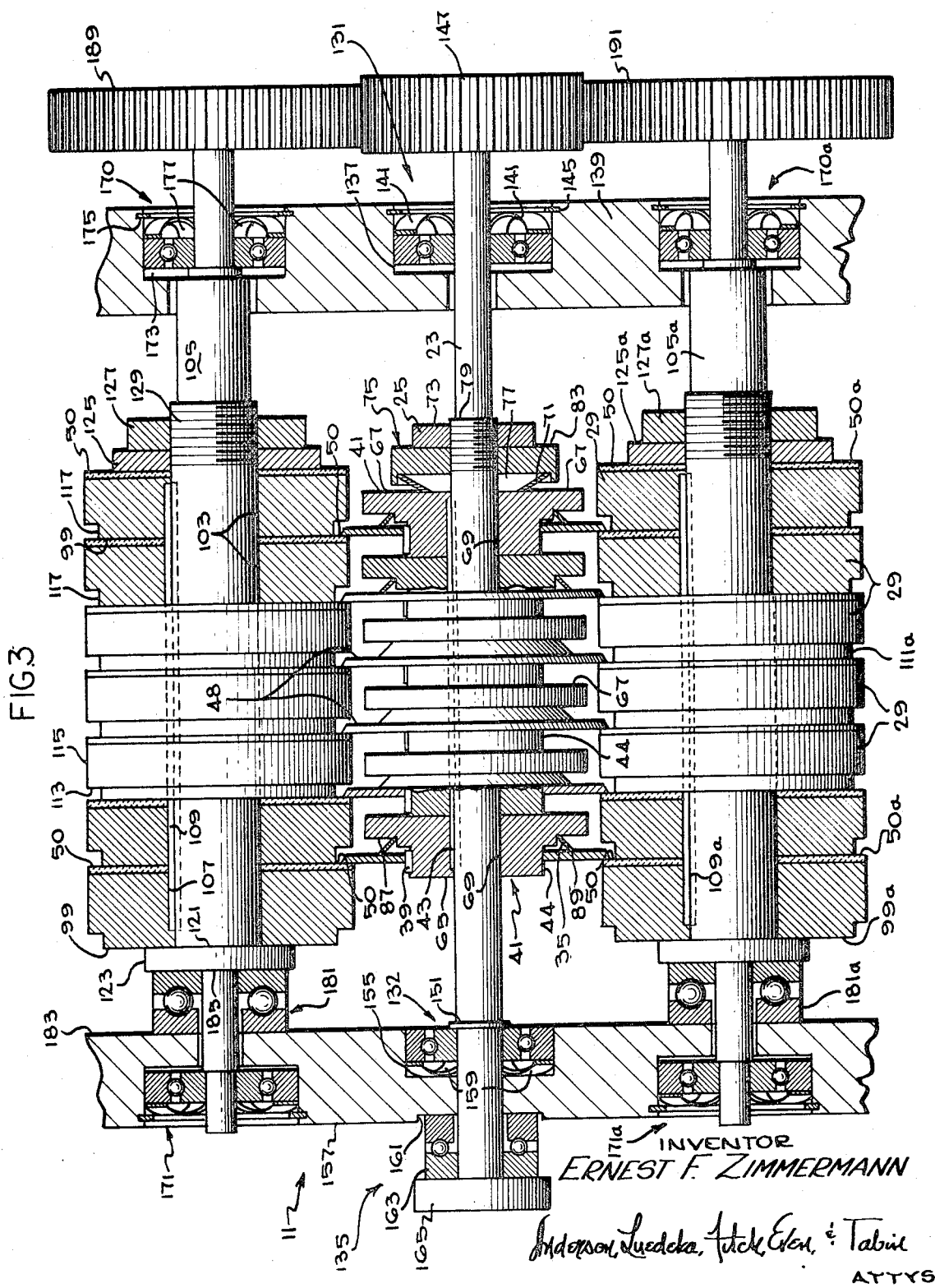
FIG. 3 is a cross-sectional view of the apparatus of FIG. 1 and embodying the novel features of the invention.
Figure 11:
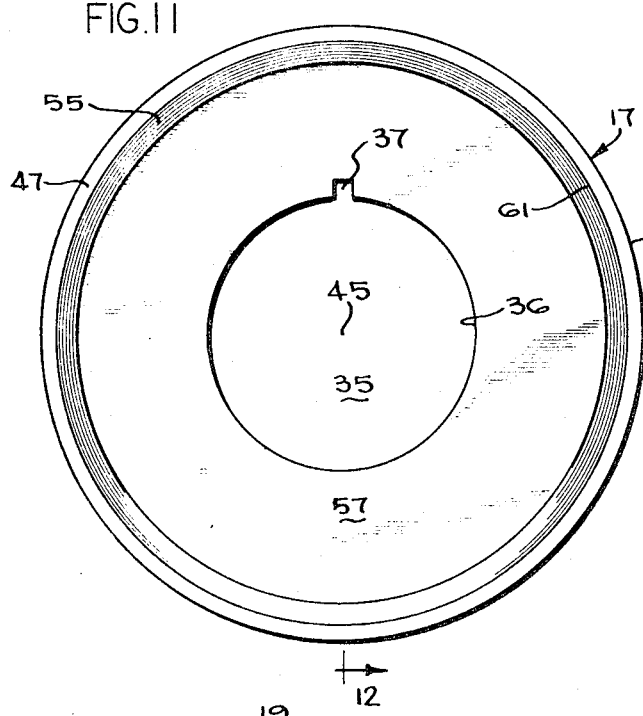
FIG. 11 is a side elevational view of a shear blade.
Figure 12:
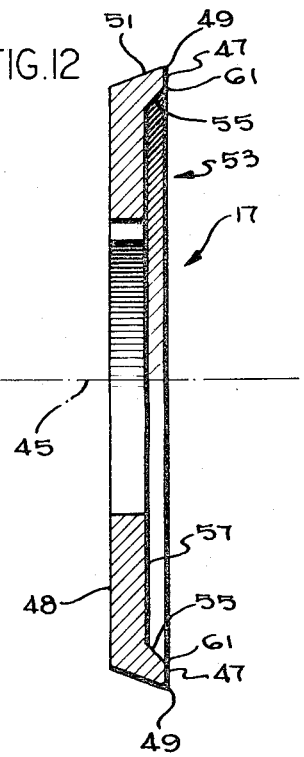
FIG. 12 is a cross-sectional view taken along the line 12—12 of FIG. 11.

Proceeding now to a more detailed description of the invention and with reference to FIG. 3, the main shearing head comprises the arbor 23 with main shearing blades 17 each biased to slide longitudinally toward and into engagement with an associated backing shearing blade 19. Also, the main blades 17 are biased by associated individual springs 21 in the form of bellows springs 33 to slide longitudinally and to remain in a plane perpendicular to the film being cut. As best seen in FIGS. 11 and 12, each of the main blades 17 is ring shaped and is formed with a large circular opening 35 defined by a circular wall 36 which is coaxial with a central axis 45 for the ring shaped blade 17. To hold the main blade 17 against rotation relative to the arbor 23, the bore wall 36 is provided with a keyway 37 to receive a key 39, FIG. 3, which is also seated in a carrier sleeve 41 which is also keyed by a key 43 to the main supporting arbor 23. Preferably each of the carrier sleeves 41 also supports bellows spring 33 thereon and a series of such carrier sleeves are abutted and telescoped on the arbor 23. Each of the bore walls 36 for the main blades 17 is dimensioned with a diameter closely approximating the diameter of the circular blade supporting surface 44 on each carrier sleeve 41. Each main blade is telescoped on and encircles its blade supporting surface 44 which generally centers the blade to be substantially perpendicular to the axis of the carrier sleeve which is coaxial with the axis of the supporting mandrel 23. Once positioned on its carrier sleeve, each blade is held against shifting axially to right, as seen in FIG. 3, by its bellows spring 33 and against axially shifting to the left by the respectively engaged backing blades 19 and 29; and, as will be explained, this further assures that each blade 17 remains in a plane perpendicular to the path of web travel.

The preferred cutting shearing blades 17 are formed entirely of a steel with a shearing face or surface 47 which is somewhat softer than a shearing surface 50 on the backup blades 19 and 29. The main shearing blades 17 are each formed with a rear, radially extending side wall 48 which is flat and planar and against which is abutted the bellow shaped spring 33. The opposite front, radially extending wall of the main blades 17 is provided with a circular, circumferentially extending cutting edge 49 formed at the junction between the radial shearing surface 47 and an inclined, circumferential wall 51 for the blade. The inclined wall 51 is disposed at an angle to a line parallel to the path of web travel. As wear occurs on the outer cutting edge 49 and shearing surface 47, the inclined wall 51 provides a continued sharpened or pointed cutting edge 49 so that the shearing blades will not need to be resharpened as often as if the outer wall were a circular shoulder about the axis 45.

Figure 13:
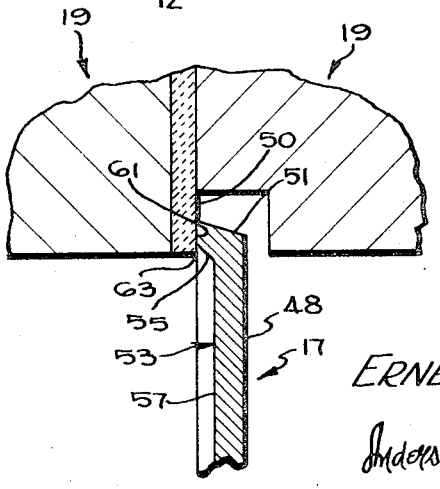
FIG. 13 is a diagrammatic enlarged cross-sectional view of a set of shearing blades.

The preferred cutting surface 47 extends radially inward for only a short distance to provide a flat and parallel contact with the backing cutting blades 19 and 29. The shearing surface 47 is thus a ring shaped surface which extends from the outer cutting edge 49 inwardly to a disk shaped cavity 53 in the front wall 52 of the main blade. The cavity 53 is defined by an inwardly and downwardly inclined wall 55 which joins a radially extending wall 57 which is parallel to the rear wall 48 of the cutting blade. The cutting surface 47 terminates inwardly at a juncture or shoulder 61 with the inclined wall 57 and when the blade is properly inclined with respect to its backup blades, it is preferred that the juncture 61 be disposed radially beyond the cutting edge 63 of the associated backing blades 19 and 29, as best seen in FIG. 13. Thus, the shearing surface 47 may be machined to relatively close tolerances and provided with a face which is closely held to a line or plane perpendicular to the axis through the blade opening 35.

Turning now in greater detail to the carrier sleeves 41 which carry both the main blades 17 and the bellow springs 33, the carrier sleeves have opposed, radially extending front and rear faces 65 and 67 which are parallel to each other and which are disposed in planes substantially perpendicular to the axis of the arbor 23. The sleeves each have a central bore 69 which is closely dimensioned to the outer cylindrical surface of the arbor 23 but is freely telescoped thereon longitudinally on the shaft. As previously stated, a key 43 extends into a keyway in each carrier sleeve and locks the respective sleeves against turning relative the supporting arbor 23.

The initial preloading pressure between the shearing surfaces 47 and 50 of the main blades 17 and backing blades 19 and 29 is provided by the biasing means which includes a main bellow spring 71 which encircles the arbor 23 with an inner smaller diameter end 73 abutted against the rear face 67 of the adjacent sleeve carrier, as best seen in FIG. 3. The outer larger diameter end of the main bellow spring 71 is abutted against a retainer 75 which has a hollow cavity 77 therein to receive the large diameter end of the main bellow spring. The retainer has an interior bore 79 which is slidable on the support shaft 23. To place the bellow spring in compression and to provide the preloading force on the carrier sleeves, the retainer nut 25 is tightened on a threaded portion 81 of the support mandrel 23 to abut and engage an outer radially extending wall 83 of the retainer and thereby act through the bellow spring 71. The main bellow spring 71 and the individual bellow springs 35 limit the amount of preload pressure to a predetermined maximum force so that the main blades will not be overloaded and wear prematurely. These bellow springs allow the retainer nut 25 to be threaded to shift the sleeves axially to bring each main blade 17 into contact with its backing blades 19 and 29 and then to be loaded with a desired amount of pressure.

Figure 10:
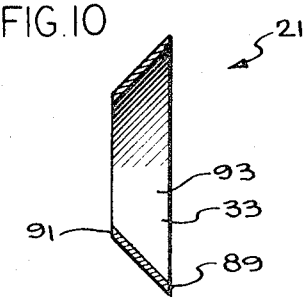
FIG. 10 is a cross-sectional view taken along the line 10—10 of FIG. 9.

The individual bellow springs 21 are mounted on the respective carrier sleeves 41 to apply a uniform, balanced force circumferentially about the main blades and in axial direction. To this end, the preferred bellow springs 35 are seated at an inner small diameter on a shoulder wall 85 formed at a juncture with a radially extending wall 87. The shoulder wall 85 is annular and its axis coincides with the axis of the carrier sleeve while the radial wall 87 is substantially parallel to the front and rear faces 65 and 67 of its respective carrier sleeve. The outer large diameter end 89 of each bellow spring 35 extends to engage the rear face 48 of the blade 17 seated on its associated sleeve. The preferred bellow springs 35 are commercially available items which are generally frusto-conical shape and made of steel with circular end walls 89 and 91, as best seen in FIG. 10, disposed substantially perpendicular to an axis through the center opening 93 in each of the spring members. The bellow springs are preferred as they are an inexpensive type of spring and provide a circumferential contact with the blade and have a certain amount of rigidity as well as resilience thereto to stabilize the shear blades. That is, the blades are centered and supported with a sufficient amount of rigidity to prevent the blades from wobbling or canting as they rotate.

Figure 1:
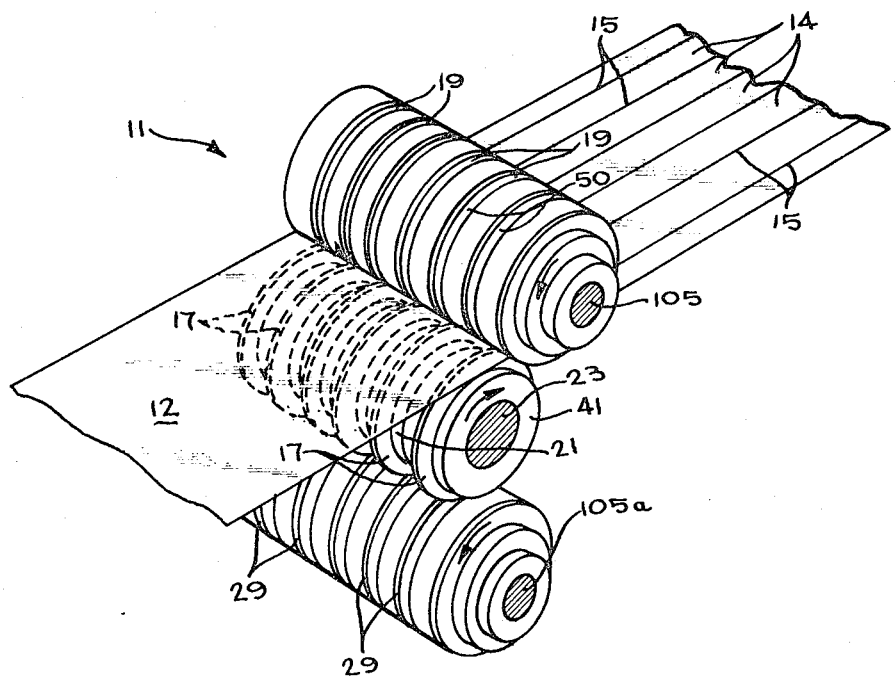
FIG. 1 is a diagrammatic view of a slitting apparatus embodying novel features of the invention.
Figure 2:
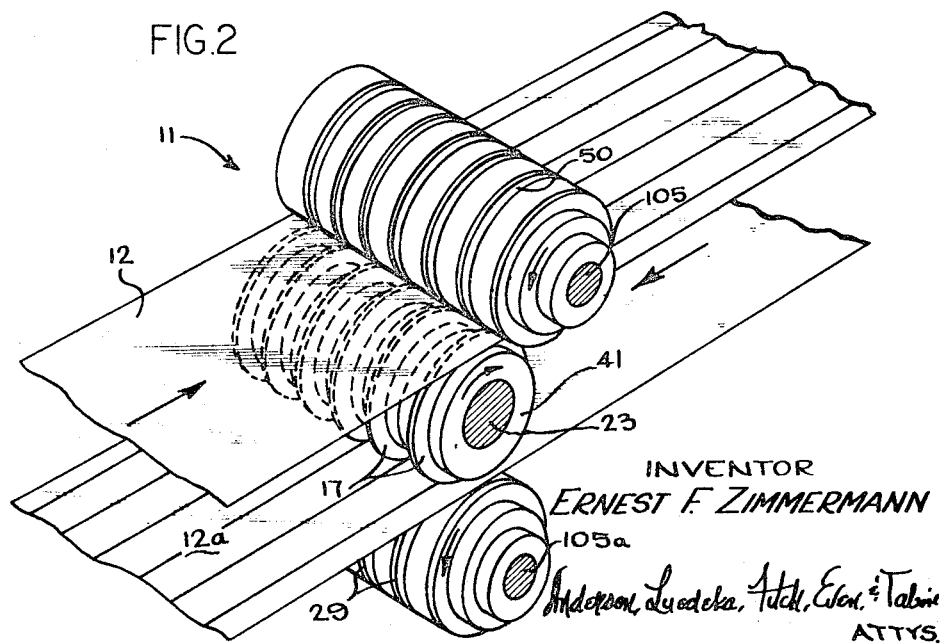
FIG. 2 is a diagrammatic illustration when severing two webs simultaneously with the apparatus of FIG. 1.

Since the backing heads having the shearing blades 19 and 29 are preferably identical in construction so as to provide the balance of forces, only a description of the backing head will be given. Identical reference characters are applied to similar elements and hence a description of one head will suffice to provide an understanding of the other. As explained previously, either one or two webs 12 or 12a may be sent through the shearing apparatus with one of the webs running between the backing shearing blades 19 and the main shearing blades 17 and the second or lower web 12a sent between the backing blades 29 and the shearing blades 17, as illustrated in FIG. 2.

The backing shearing blades 19 are preferably sized to relatively exact dimensions in the axial direction to control the width dimension of the tapes 14 cut from the web 12 to achieve the close width tolerances such as plus or minus 0.002 inches over a narrow width of web, for example, 0.250 inch. To this end, the dimension between a forward wall 99 for the cutting disk and its rear shearing face 50 is closely dimensional to the nominal width dimension for the strip. By having this dimension of the backing blades 19 held closely and by abutting each of the main blades 17 thereagainst, the width dimension for each of the respective tapes 14 may be closely held to the desired dimensions. These dimensions are maintained as the hard refractory shearing surfaces 50 receive very little wear as contrasted to the softer faces on the main shearing blades 17.

In this instance, the backing shearing blades 19 are each formed with a central bore 103 having a diameter closely matching that of the outer diameter of a second rotatable supporting means therefor which is preferably in the form of a shaft 105. The bore 103 and the shafts 105 are substantially coaxial and define the rotational axis for the backing blades 19. In this instance, each of the respective backing blades 19 is formed with a keyway 107 into which projects a key 109 keyed to the support shaft to prevent turning of this second set of shear blades 19 on the shaft 105.

Each of the main shearing blades projects into an annular groove 111 formed in each backing shearing blade 19 in order to abut a refractory shearing surface 50. The groove is sufficiently narrow in width that the majority of the backing blade 19 will support the tape web while shearing. The annular groove is formed by a radially extending shoulder wall 113 extending radially inward from an outer circumferential wall 115 for the backing blade to a smaller diameter, shoulder wall 117 which extends from the radial wall 113 to the front face 99 of the backing blade. The annular shoulder wall 117 defines the bottom wall for the groove 111 and is spaced from the outer edge 49 for the main blades projecting into the groove.

To locate the backing blades 19 at predetermined positions on the supporting shaft 105, there is provided a reference surface 121 in the form of a radially extending wall on an enlarged collar 123 formed at one end of the support shaft 105 and formed integral therewith. The reference surface 121 is machined to be in a plane perpendicular to the axis of the shaft 105 and at a predetermined distance from the ends of the shaft 105. As best seen in FIG. 3, the first (left) one of the series of backing shearing blades 19 is abutted against the reference surface 121 and then each of the remaining blades 19 are telescoped on the supporting shaft 105 with the forward wall 99 of each blade abutting shearing surface 50 of the previously telescoped blade. The last (right hand) shearing blade 19 is engaged by a retaining washer 125 which in turn is abutted by a retaining nut 127. More specifically, the retaining nut 127 has an internal thread threaded on a threaded portion 129 of the support shaft 105 to abut the washer 125 and through the washer to apply an axially directed force to and through the series of backing blades 19. By keeping the engaged surfaces of the blades clean and by forcing the blades against the reference surface 121, the backing blades 19 are located at predetermined positions on the support shaft 105. Likewise, then the movable main cutting blades 17 are urged into engagement therewith are located properly.

As the shearing surfaces 50 on the backing blades are relatively hard as compared to the iron oxide on the magnetic tapes 14 and to the steel of the main blades 17, the exact width dimension is maintained as any wear which occurs will be primarily on the main shearing blades which, as pointed out previously, move to compensate for any such wear.

To reduce the number of variables acting against the precise positioning of the respective blades 17, 19 and 29, the preferred mounting arrangement for the arbor 23 and the supporting shafts 19 causes the loads to be resolved into either radially or axially directed components of force. More specifically, the arbor 23 and the shafts 19 are supported by axial and radial thrust bearing means to resolve any forces being generated or applied into radial and axial components. For instance, the mandrel 23 is mounted for rotation by radial, load thrust bearings 131 and 132 of the ball bearing kind and is provided with an axial load, thrust bearing 135. The radial load bearing 131 is mounted within a recess 137 of a stationary frame member 139 with a pair of leaf spring members 141 disposed between a side 143 of the bearing and an outer retainer ring 145 snapped into a circular groove adjacent an opening leading to the recess 137. The inner race of the bearing 131 encircles and supports the arbor 23 for rotation which is accomplished by turning a tooth gear 147 attached to one end of the arbor 23.

At the opposite end of the support shaft 23, a collar 151 on the support shaft abuts an inwardly facing wall of the radial load bearing 132 which is seated in an opening 155 in another stationary frame member 157. A pair of leaf springs 159 are disposed between an interior bottom wall of the cavity 155 and an adjacent side of the bearing to urge the latter against the collar 151 on the main shaft 23. Thus, the bearings 131 and 132 support the arbor 23 for rotation. To take axially directed loads, the axial thrust bearing 135 is disposed outwardly of the frame member 157 with an inner race thereof seated in a groove 161 in the outer side of the frame and an outer race 163 is abutted against a thrust collar 165 formed integral with and attached to the end of the main support mandrel 23.

In a generally similar manner, the backing blades 19 are provided with radial load, thrust bearings 170 and 171 which are substantially identical in construction and function for rotationally supporting the opposite ends of the shaft 105. Each of the thrust bearings 170 and 171 is received in a recess 173 in the respective frame members 139 and 157. A snap ring 175 abuts leaf springs 177 to urge the radial load bearings in fully seated positions in the respective recesses 173. Axially directed thrust loads for the shaft 105 are taken by an axial thrust load bearing 181 which is located between a facing wall surface 183 of the frame member 157 and a surface 185 on the shaft collar 123. More specifically, the collar surface 185 has a radially extending surface on the shaft 105 and is substantially parallel to the reference surface 121. The collar surface 185 abuts one bearing race of the axial thrust bearing with the other bearing race abutting against the frame surface 183.

Preferably, the shearing blades 17 and 19 are driven at a predetermined speed and by a common motor drive (not shown) which drives a gear 189 attached to one end of the support shaft 105. The gear 189 is meshed to drive the gear 147; and the supporting shaft for the balancing blades 29 is driven through a gear 191 meshed with gear 147 to rotate the blades 29 at the speed as the blades 19 rotate.

As an aid to understanding the invention, a brief review of the operation of the illustrated apparatus will now be given. The web 12 is located and is held in a relatively fixed tracked path of travel and in a generally horizontal plane and is disposed between the main shearing blades 17 and the backing shearing blades 19 with the respective blades being positioned with their cutting edges in planes substantially perpendicular to the path of web travel. The main shearing blades 17 each have a shearing surface 47 which is abutted against a shearing surface 50 for backing blades 19 and as the respective blades revolve the outer shearing edges 49 and 63 of these blades sever the thin web along a straight line edges 15.

Each of the main shearing blades 17 is preloaded to abut a backing blade 19 to have substantially the same preload force thereon as a result of the turning of the retaining nut 25 to compress a biasing means which biases each of the respective blades into engagement with a cutting surface of its backup blades. The preferred biasing means includes the main bellow spring 71 which is urged by the retainer nut assembly to slide carrier sleeves 41 into contact with faces 50 of the backing shearing blades. The force from the main bellow spring 73 is transferred between the abutted carrier sleeves to the individual bellow springs 35 which urge the respective main blades 17 axially along the support surfaces 44 towards the faces 101 of the backing blades. The main blades are held against being canted and will be uniformly balanced and positioned normal to the path of web travel and the axis of their rotational supporting shaft 23 by the backing blades 29 which also may serve to cut an additional web.

Wear of the blades is made more predictably and is compensated for by having the main shearing blades 17 made of a steel which is softer than the steel oxide on the magnetic film which, in turn, is softer than the alumina sprayed refractory on the surfaces 50 of the respective backing shear blades 19 or 29. To provide a long lasting cutting edge 49 on the main blades 17, the outer circumferential walls 51 thereof are formed at an angle to the horizontal.

As the backing blades 19 and 29 are accurately dimensioned in axial direction to the size of the tapes 14 to be severed and experience little wear, the width dimension between the opposite parallel side edges 15 of the tapes 14 is maintained to accurate tolerances which may be exceedingly close such as, for example, within several thousandths of an inch. Also, aiding in providing the parallelism and the positioning of the blades in planes normal to the flat planar web 12 are the thrust and radial load bearings which break into axial or radial thrust loads forces tending to cause the support shafts 105 or the arbor 23 to become misaligned from positions parallel to one another and to the path of web travel. By holding these arrangements and by locking the particular web against shifting, the width between the tape edges 15 may be maintained. The outer two tapes severed from the web are considered waste inasmuch as the outermost edges of the web may not have a straight line cut and may not be held to the dimensional tolerances needed.

Figure 5:
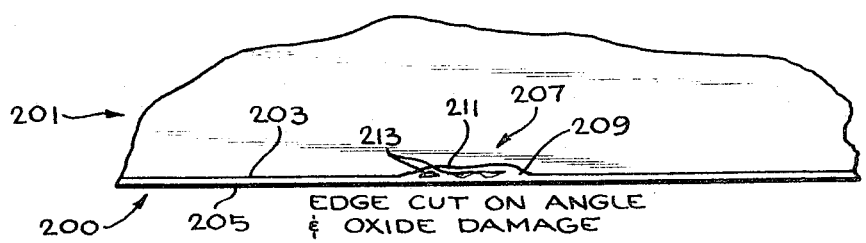
FIGS. 5, 6, 7 and 8 are enlarged plan views of defects in tape edges severed with prior art apparatus.

Some of the typical defects in the cut edges 200 of magnetic tapes 201 severed from webs with prior art devices will be described herein in connection with FIGS. 5 and 8. When the cutting edge is not perpendicular to the plane of the web, the cut edge is not normal to the flat sides of the web but is at an angle to the normal. A line 203 in FIG. 5 indicates the top of the cut edge 200 while a line 205 indicates the bottom of the angled edge. This angle edge 200 also illustrates oxide damage at 207 wherein the iron oxide on the top of a Mylar substrate 209 is peeled away to reveal the substrate 209 along an irregular line 211 and small, discrete particles 213 of iron oxide remain visible on the substrate. The loss of iron oxide at the edge 200 interferes with the ultimate use of the magnetic tape and is to be avoided. Where the edge of the blade is dull or nicked, the edge 201 of the severed magnetic tape 200 may be ragged with pieces 215 of the film substrate projecting outwardly and forming an uneven edge appearance, such as illustrated in FIG. 6.

When the web 12 is severed between a pair of shearing surfaces which allow the web to bend or fold into a space between the shearing surfaces, the cut edge 201 may have an extruded appearance (FIG. 7) in which it appears as if the substrate material, Mylar, in this instance, is stretched and pulled until it ruptures along a ragged outer line 219. The extruded edge is devoid of iron oxide coating between the line 221 and inner line 223 in FIG. 7. In some instances, the substrate 209 at the edge appears to be rolled, i.e. curved downward along the edge with particles of oxide missing leaving a mottled appearance 225 along the rolled edge, as best seen in FIG. 8. The rolled edge is also usually caused by the material being pushed down into the space between a pair of shearing surfaces and bending from a plane generally normal to the shearing surfaces to a plane more parallel to the shearing surfaces. Often the rolled edge occurs because the shear surfaces are grossly misaligned or spaced apart for the thickness of the thin web being severed. Here again, the edge is damaged between an inner line 227 and outer slightly ragged line 229.

The edges 15 for the magnetic tapes should be similar to that disclosed in FIG. 4 wherein the edge 15 is straight, not ragged, cut normal to the top and bottom sides of the tape rather than cut on angle, has little oxide damage along the portion adjacent the edge 15, and is held to a close tolerance width for the tape. While the cut edges 200 shown in FIGS. 5–8 may be satisfactory for many applications, such edges are undesirable for magnetic tapes or other applications requiring quality edges and close tolerance width dimensions.

From the foregoing, it will be seen that there is provided an inexpensive and simple shearing apparatus for shearing to accurate width dimensions webs of thin material with good edge quality and for long lengths of web. The shear blades are accurately positioned and preloaded to provide quality tape edges which are smooth and show little damage to the coating along the edges. By adjusting blades with wear and having certain of the blades made significantly harder than the ferrous oxide particles on the tape, the apparatus may be used for long lengths of web without replacing the blades.

When shearing magnetic tape webs with the present invention, some of the powdered oxide on the web is liberated and serves as a sharpening or lapping compound to maintain a sharp edge on the cutter blade of the softer material. This is in contrast to the previously described conventional shearing devices in which the powdered oxide was detrimental and dulled the shearing blades.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A shearing apparatus for shearing an elongated, thin flexible web into a plurality of strips having closely dimensioned widths and parallel straight line edges comprising, a first support means rotatably mounted for turning about a first axis, a first set of shearing blades mounted on said first support means in planes normal to said axis for rotation with said support means and being movable in an axial direction along said first support means, an annular shearing surface on each of said first shearing blades and a circular shearing edge on said shearing surface for shearing said web, a second support means rotatable about a second axis spaced from and parallel to said first axis, a second set of second shearing blades mounted on said second support means in planes normal to said second axis for rotation with said second support means, said first shearing blades having a width in the axial direction substantially less than the width of said second shearing blades, said first shearing blades being spaced from each other at identical distances along said first support means, an annular shearing surface on each of said second shearing blades in abutment with one of the respective annular shearing surfaces on said first shearing blades, a circular shearing edge on each of said second shearing surfaces for cooperating with an adjacent shearing edge of a first shearing blade to shear said web passing therebetween, and means individually biasing each of said first shearing blades into said abutment with a predetermined amount of force to establish a severing of the web between each pair of cooperating first and second shearing edges, said means for individually biasing said first shearing blades comprising bellow springs encircling said first support means, each of said bellow springs abutting one of said first shearing blades on a side opposite from its shearing surface and urging the latter against the cooperating shearing surface of a second shearing blade.

2. A shearing apparatus in accordance with claim 1 in which radial and axial thrust bearings mount said first and second support means for rotation and limit the loads thereon to axially and radially directed components.

3. A shearing apparatus for shearing an elongated, thin flexible web into a plurality of strips having closely dimensioned widths and parallel straight line edges comprising, a first support means rotatably mounted for turning about a first axis, a first set of shearing blades mounted on said first support means in planes normal to said axis for rotation with said support means and being movable in an axial direction along said first support means, an annular shearing surface on each of said first shearing blades and a circular shearing edge on said shearing surface for shearing said web, a second support means rotatable about a second axis spaced from and parallel to said first axis, a second set of second shearing blades mounted on said second support means in planes normal to said second axis for rotation with said second support means, an annular shearing surface on each of said second shearing blades in abutment with one of the respective annular shearing surfaces on said first shearing blades, a circular shearing edge on each of said second shearing surfaces for cooperating with an adjacent shearing edge of a first shearing blade to shear said web passing therebetween, and means individually biasing each of said first shearing blades into said abutment with a predetermined amount of force to establish a severing of the web between each pair of cooperating first and second shearing edges, said means for individually biasing said first shearing blades comprising bellow springs encircling said first support means, each of said bellow springs abutting one of said first shearing blades on a side opposite from its shearing surface and urging the latter against the cooperating shearing surface of a second shearing blade, said first support means comprising a rotatable shaft, a plurality of sleeve carriers telescoped on said shaft and in abutting relationship with each other, each of said carrier sleeves carrying one of said bellow springs and one of said first shearing blades.

4. A shearing apparatus for shearing webs of synthetic resin having particles of iron oxide thereon into a plurality of tapes having closely dimensioned widths and substantially parallel, straight line edges, said device comprising a frame, first, second and third shafts, each of said shafts being mounted in said frame for rotation about spaced, parallel first, second and third axes each through one of said shafts, a set of first shearing blades spaced axially on said first shaft having circular shearing edges and having annular shearing surfaces thereon of a steel material softer than the iron oxide particles, means on said first shaft mounting said first set of shearing blades for rotational movement with said shaft in planes normal to said first axis and for permitting said first set of blades to slide axially along said first shaft, a second set of shearing blades on said second shaft each having circular shearing edges and second shearing surfaces engageable with said first shearing surfaces of said first shearing blades, said second shearing surfaces being made of a material which is harder than said iron oxide whereby wear will predictably occur on said first shearing surfaces, a third set of blades mounted on said third shaft and engaging said first shearing blades to hold the same in planes perpendicular to said first axis, and means for urging said first set of shearing blades to slide axially on said first shaft to maintain contact between said first and second shearing surfaces initially and after wear of said first shearing surfaces, said second shearing surfaces on said second set of shearing blades including a refractory having a hardness of at least nine MOHS.

5. A shearing apparatus in accordance with claim 4 in which said refractory is alumina.

6. A shearing apparatus for shearing webs of synthetic resin having particles of iron oxide thereon into a plurality of tapes having closely dimensioned widths and substantially parallel, straight line edges, said device comprising a frame, first, second and third shafts, each of said shafts being mounted in said frame for rotation about spaced, parallel first, second and third axes each through one of said shafts, a set of first shearing blades spaced axially on said first shaft having circular shearing edges and having annular shearing surfaces thereon of a material softer than the iron oxide particles, means on said first shaft mounting said first set of shearing blades for rotational movement with said shaft in planes normal to said first axis and for permitting said first set of blades to slide axially along said first shaft, a second set of shearing blades on said second shaft each having circular shearing edges and second shearing surfaces engageable with said first shearing surfaces of said first shearing blades, said second shearing surfaces being made of a material which is harder than said iron oxide whereby wear will predictably occur on said first shearing surfaces, a third set of blades mounted on said third shaft and engaging said first shearing blades to hold the same in planes perpendicular to said first axis, and means for urging said first set of shearing blades to slide axially on said first shaft to maintain contact between said first and second shearing surfaces initially and after wear of said first shearing surfaces, preload means on said first shaft for exerting a preload, axially directed force to an adjacent one of said first set of shearing blades, said means for urging said first set of first shearing blades including a series of bellow springs on said first shaft, each bellow spring being preloaded by said preload means and limiting the force it exerts on its associated first shearing blade to prevent excessive preload forces between certain ones of said first and second shearing blades.

* * * * *